United States Patent [19]

Smith

[11] Patent Number: 5,289,843
[45] Date of Patent: Mar. 1, 1994

[54] HYDRAULIC SAFETY VALVE

[76] Inventor: Roger R. Smith, 7261 Lyons Rd., Imlay City, Mich. 48444

[21] Appl. No.: 703,844

[22] Filed: Jun. 7, 1993

[51] Int. Cl.$^5$ ............................................. F16K 17/00
[52] U.S. Cl. .................................... 137/115; 137/464; 137/466
[58] Field of Search ...................... 137/115, 464, 466

[56] References Cited

U.S. PATENT DOCUMENTS

| 4,446,890 | 5/1984 | Simpson | 137/464 |
| 4,742,841 | 5/1988 | Vonderhaar | 137/466 X |

FOREIGN PATENT DOCUMENTS 657783 9/1951 United Kingdom ................ 137/464

Primary Examiner—Robert G. Nilson
Attorney, Agent, or Firm—Peter A. Taucher; Gail S. Soderling

[57] ABSTRACT

A hydraulic safety valve adapted to cut or divert the flow of pressurized fluid A hydrau/sudden rupture occurs in the hydraulic system. The valve has a valve body with an inlet port, first and second outlet ports and a sump port. A first valve member controls the inlet port and directs fluid to one of the out let ports and a second valve member disposed within the valve which blocks the sump port when the valve is in operating position and directs the flow of pressurized fluid into the sump when the system pressure fails.

2 Claims, 1 Drawing Sheet

HYDRAULIC SAFETY VALVE

GOVERNMENT INTEREST

The invention described herein may be manufactured, used and licensed by or for the United States Government for governmental purposes without payment to me of any royalty.

BACKGROUND OF THE INVENTION

1. Field of the Invention

In one aspect this invention relates to hydraulic system components. In yet a further aspect, this invention relates to a safety relief valve for use in protecting hydraulic systems from catastrophic failures.

2. Prior Art

Hydraulic systems are useful in many environments which require a continuously variable source of power. As with any drive system, the possibility exists of a catastrophic failure in the system. Such failures can have lethal results as many industrial accidents have sprayed workers with hydraulic fluid which then burned and killed the workers. An even larger number of workers have been seriously injured.

Another use of hydraulic systems is on combat vehicles where the systems are-used to drive various components and functions. The threat of system rupture is particularly pronounced in combat vehicles which are subjected to attack by enemy munitions rupturing the system and resulting in sparks or flame increasing the possibility of ignition of flammable materials. In such a situation, it is particularly important to prevent the hydraulic fluid from entering into the passenger compartment or spraying nearby personnel. In the event of such a failure it is desirable to have the fluid shunted to an auxiliary line, a sump or other reservoir. This will protect the crew and surrounding personnel from fire hazards by safely containing any flammable fluids. It also protects the environment from contamination with toxic, corrosive hydraulic fluids.

BRIEF SUMMARY OF THE INVENTION

The present invention discloses a simple valve structure which can be positioned between a source of pressurized hydraulic fluid and the remainder of the system; the valve has a structure which will react rapidly and passively to divert the flow of pressurized hydraulic fluid to an auxiliary line or safety reservoir if there is a substantial drop in hydraulic pressure signalling a catastrophic failure. Briefly, the valve of the present invention has a valve body with a number of ports, more specifically, an inlet port, first and second outlet ports, and a sump or dump port. The inlet port is connected to a source of hydraulic fluid such as a hydraulic pump which provides a continuous flow of high pressure fluid to the system for operating one or more hydraulically driven devices.

A first outlet port is fluidly connected to the inlet port by a first passageway, the first passageway also having an extension directed to a common chamber. The second outlet port and the dump port are both fluidly connected to the common chamber which is in turn fluidly connected to the inlet port by a second passageway.

A sliding valve member is disposed at the inlet port and is adapted to direct fluid flow from the inlet port to either the first or second passageway depending upon the valve's position. The sliding valve member directs the fluid flow into the first passageway upon system start up. As the system reaches operating pressure, the sliding valve moves to a second position and the fluid flow is directed to the chamber.

A piston member is disposed within the common chamber with a biasing means which urges the piston into a position which blocks the second outlet port when the valve is in the start up mode and block the dump port when the valve is in the normal operating position.

BRIEF DESCRIPTION OF THE DRAWING

In the accompanying drawing.

FIG. I Is a cross section of one valve according to this invention in the start up mode.

DETAILED DESCRIPTION OF PREFERRED EMBODIMENTS

Figure 1:
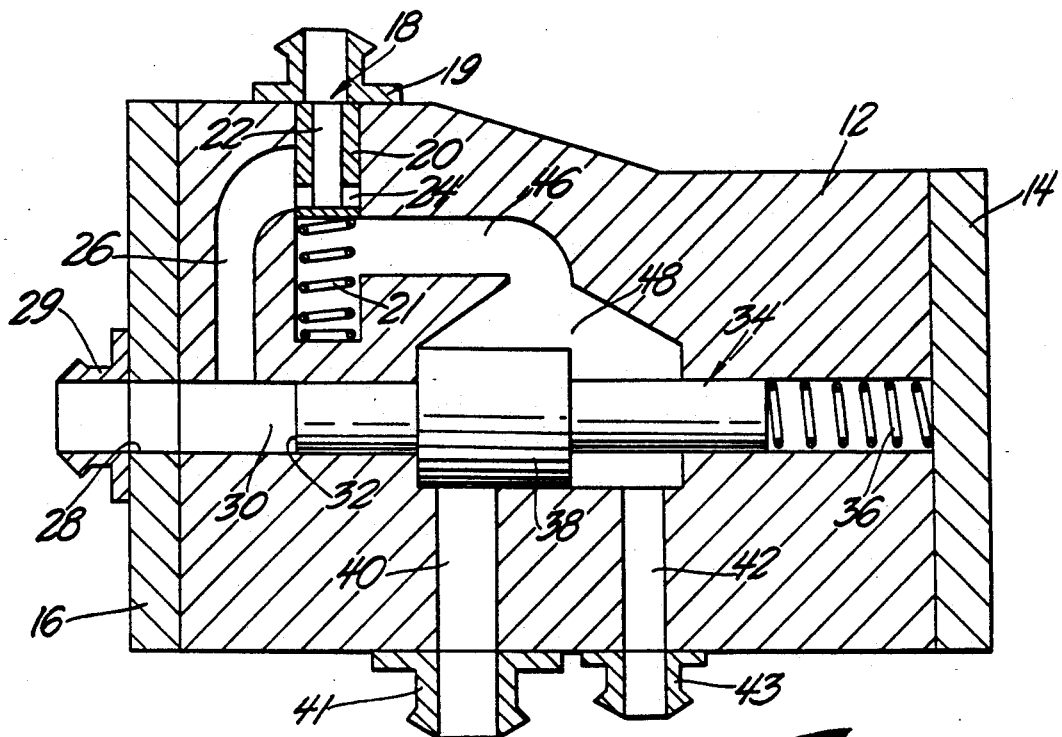

Referring to the accompanying drawing where like numerals refer to like parts, and initially to FIG. 1, one illustrative example of a safety valve according to this invention is designated 10. The safety valve 10 has a valve body portion 12 with caps 14, 16 attached to the ends of the body portion 12 to seal the passageways formed in the body to make a unitary valve body containing various passages and a chamber. The body structure 12 shown is designed to be formable by casting or other conventional metal working means and the end caps are attached after assembly of the remaining components to consolidate the safety valve into a single structure.

The safety valve 10 as shown in this example has inlet port 18 attached to a source of pressurized fluid such as a hydraulic pump (not shown) adapted to deliver a constant flow of pressurized hydraulic fluid to the safety valve 10 by means of a snap coupling 19, although other attachment means are known in the art. The pressurized fluid is used to power a hydraulic device such as a hydraulic motor or conveyer line also not shown. Hydraulic pumps and devices are well known in the art so their structure and operation will not be described in detail.

The inlet port 18 has a tubular poppet 20 disposed in the inlet port 18 to direct the flow of pressurized fluid within the valve 10. The tubular poppet 20 is adapted to slide longitudinally within the inlet port 18 in response to the pressure applied by hydraulic fluid entering the inlet port the tubular poppet being biased to its unpressurized starting position shown in FIG. I juxtaposed the snap coupling 19 by means of a first biasing spring 21. Tubular poppet 20 is formed as a cylindrical body with a centrally disposed longitudinally extending bore 22 and a plurality of apertures 24. The apertures 24 are located on the end of tubular poppet 20 distal the coupling and outer surface of the valve body 12. Pressurized hydraulic fluid entering the inlet port 18 passes into the longitudinal bore 22 and exits the tubular poppet 20 in to the valve body through the apertures 24. In the start up position shown in FIG. 1, the pressurized hydraulic fluid from the tubular poppet 20 exits one or more apertures 24 into a first passage 26 shown in the drawing on the left side of the safety valve 10 and after passing through passage 26 exits the first outlet port 28 attached to the remainder of the system by a snap fitting 29. The pressure in bore 30 is permitted to increase by suitably sizing the external line to port 28 to impede the fluid flow, or other suitable means. The pressurized fluid also flows into a bore 30 applying an increasing pressure on the face 32 of a biased piston 34 until the pressure on face 32 reaches the operating pressure of the hydraulic fluid.

When the hydraulic fluid pressure in the extension 30 of the safety valve body 12, reaches operating pressure the pressure on face 32 of piston 34 is greater than the biasing effect of a second biasing spring 36 compressing the second spring and moving the piston head 38 of the piston 34 to uncover a second outlet 40 also connected to the system by a snap fitting 41. Simultaneously, the piston's head 38 covers a sump outlet 42 attached to a storage line by means of a snap fitting 43.

Concurrently with the hydraulic pressure build up moving piston 34 against the second biasing spring 36 to its operating position, the pressure on the bottom face of the tubular poppet 20 forces moves the tubular poppet 20 against the biasing force of the first biasing spring 21 moving the tubular poppet into the valve body 12 so that the radially extending channel 24 is in fluid communication with a second passage 46.

Figure 2:
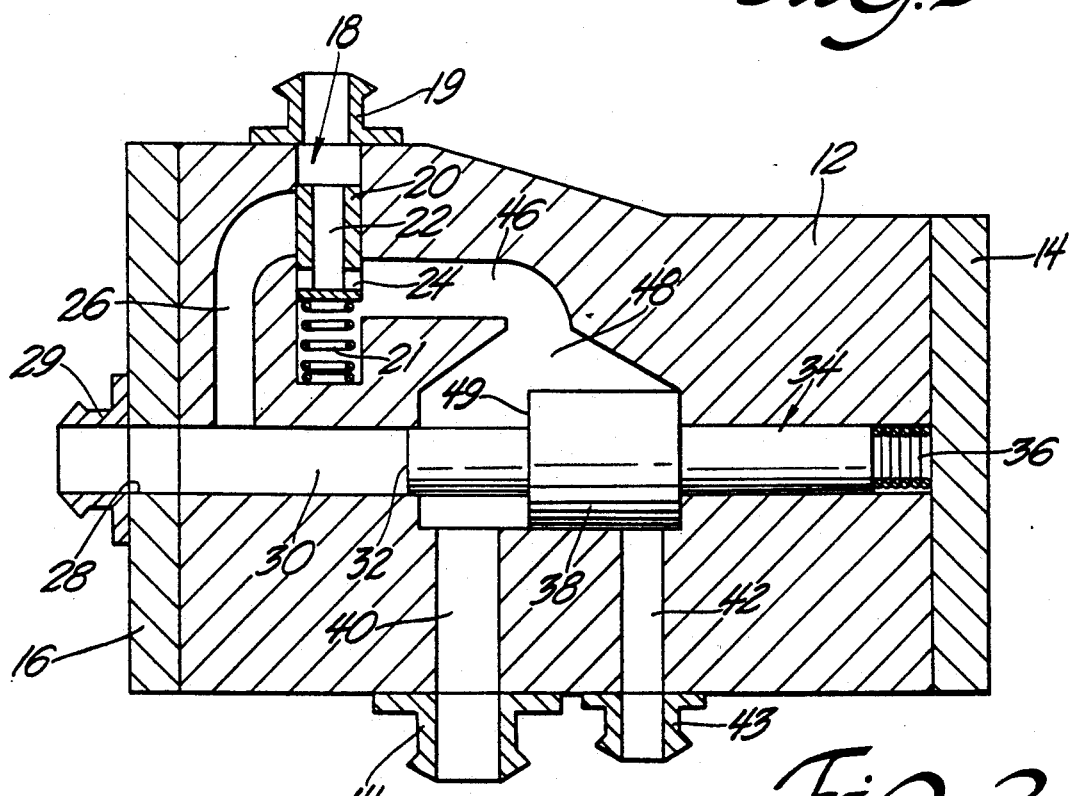
FIG. 2 is the valve of FIG. I in the normal operating position.

In this steady state operating position shown in FIG. 2, the hydraulic fluid exits the aperture 24 which is in fluid communication with chamber 48 and exits via both the outlet port 40 which is connected to the system or systems to operated. With flow through passage 26 blocked by poppet 20, pressure in bore 30 decreases to atmospheric pressure, and piston 38 is held to the right by the pressure in chamber 48 acting against surface 49. The dump port 42 is completely blocked keeping the pressure in the system at the required operating pressure.

When the system suffers a sudden loss of pressure, the pump which provides the pressurized fluid will not maintain the operating Pressure required to keep the second biasing spring 36 compressed and the spring's force will rapidly force piston 38 back to its initial position blocking both the second outlet 40 and the extension 30 preventing any substantial fluid flow from chamber 48 to the outlet ports 40. The sump port 42 is simultaneously opened allowing the fluid to pass to the sump port 42 unhindered. The fluid will be recycled to the storage sump preventing the hydraulic fluid from being spilled. The tubular poppet 20 remains in the second operating position due to hydraulic fluid pressure to prevent pressurized fluid from entering channel 26.

Various modifications and alterations will become apparent to those skilled in the art with out departing from the scope and spirit of this invention and it is understood that this invention is not limited to the illustrative embodiments set forth above.

What is claimed is:

1. A hydraulic safety valve for inclusion in a hydraulic system having a source of pressurized fluid transmitted to a hydraulically operated device by means of hydraulic line, the valve being adapted to cut or divert the flow of pressurized fluid when a sudden rupture occurs in the hydraulic system, the safety valve comprising: a valve body having an inlet port, first and second outlet ports and a sump port, the first outlet port being fluidly connected to the inlet port by a first passageway and the second outlet port and the sump port being fluidly connected to the inlet port by a second passageway the sump port and second outlet port being joined to a common chamber, a first valve member disposed at the inlet port and being adapted to direct fluid flow from the inlet port to either the first or the second passageway and a second valve member disposed within the common chamber; biasing means associated with the second valve member to bias the second valve member into a position which blocks the second outlet port when the valve is in the start-up mode and blocking the sump port when the valve is in the normal operating position the first valve directing the flow of pressurized fluid into the first passageway upon start-up to force the second valve member to the open position for operation.

2. A hydraulic safety valve for inclusion in a hydraulic system having a source of pressurized fluid transmitted to a hydraulically operated device by means of a hydraulic line, the valve being adapted to cut or divert the flow of pressurized fluid when a sudden rupture occurs in the hydraulic system, the safety valve comprising:

a valve body portion the valve body having an inlet port fluidly connected to the source of pressurized fluid adapted to deliver a constant flow of pressurized hydraulic fluid to the safety valve, a first passage formed in the valve body, a first outlet fluidly connected to the first passage, the first outlet being connected to the hydraulic system, a chamber fluidly connected to the inlet port at a point removed from the first passage, a second outlet port fluidly connected to the chamber, the second outlet port also being connected to the hydraulic system, and a sump in fluid communication with the chamber, the sump being connected to a reservoir to capture hydraulic fluid when the hydraulic system looses pressure;

a tubular poppet disposed within the inlet port the tubular poppet formed as a cylindrical body with a centrally disposed longitudinally extending bore closed at the end of the poppet nearest the center of the valve body, and having a plurality of apertures formed near the closed end of the tubular poppet, the tubular poppet being adapted to slide longitudinally within the inlet port between a first start up position and a second operating position in response to pressure applied by hydraulic fluid entering the inlet port the apertures discharging the pressurized hydraulic fluid into the first passageway when the tubular poppet is in the first start up position and discharging the hydraulic fluid into the chamber when the tubular poppet is in the second operating position;

a first biasing spring acting on the tubular poppet to bias the tubular poppet to the start up position where pressurized hydraulic fluid entering the inlet port passes into the longitudinal bore and exits the tubular poppet at the apertures into the first passage way until operating pressure is reached and allowing the tubular poppet to move to the second operating position when the final operating pressure is achieved;

a piston moveable between an first start up position and a second operating position, the piston having a head and stem, the head being positioned to block a portion of the first passage way in the start up position the pressure on the head caused by the hydraulic pressure in the first passageway being directed to move the piston towards its operating position, the head blocking the sump outlet when in the operating position;

a second biasing spring acting on the piston stem biasing the piston to the first position with the second outlet closed and the sump outlet open the spring allowing the piston to move to its second position blocking the sump outlet and opening the second outlet as the hydraulic pressure increases simultaneously moving the tubular poppet to the second position admitting hydraulic fluid to the chamber, and when the system suffers a sudden loss of pressure, the biasing means will force the piston rapidly to its first position blocking the second outlet and simultaneously opening the sump allowing the hydraulic fluid to pass to the sump unhindered preventing the hydraulic fluid from being spilled.

* * * * *